United States Patent
Fox et al.

[15] 3,660,231
[45] May 2, 1972

[54] STEAM COOLED NUCLEAR REACTOR

[72] Inventors: Jack N. Fox; Ned P. Hansen; Eugene E. Olich; Ralph W. Guenther, all of San Jose; Herbert J. Rubinstein, Los Gatos, all of Calif.

[73] Assignee: General Electric Company

[22] Filed: Nov. 26, 1968

[21] Appl. No.: 778,998

[52] U.S. Cl..............................176/56, 176/40, 176/59, 176/60, 176/86, 176/87
[51] Int. Cl...........................................G21c 15/00
[58] Field of Search.................176/40, 60, 59, 86, 56, 87

[56] References Cited

UNITED STATES PATENTS

| | | | |
|---|---|---|---|
| 3,183,167 | 5/1965 | Bradley | 176/59 |
| 3,249,507 | 5/1966 | Gondoin et al. | 176/59 |
| 3,400,049 | 9/1968 | Wolfe | 176/40 X |
| 3,414,473 | 12/1968 | Schluderberg et al. | 176/56 |
| 3,448,007 | 6/1969 | Ritz | 176/59 |

Primary Examiner—Carl D. Quarforth
Assistant Examiner—S. R. Hellman
Attorney—Ivor J. James, Jr., Samuel E. Turner, John R. Duncan, Frank L. Neuhauser, Oscar B. Waddell and Melvin M. Goldenberg

[57] ABSTRACT

A nuclear reactor pressure vessel internals arrangement including a core assembly, control means and steam flow directing means is disclosed. The reactor utilizes a two-pass steam flow scheme in which steam flows downwardly through non-fueled core components and then flows upwardly through the fuel assemblies. The reactor internals are located within a shroud which forms a second pressure-tight vessel. Water located in an annular space between the internal shroud and the main pressure vessel provides additional shielding and is readily available for core flooding. The arrangement provides improved safety, simplicity and reliability in steam cooled reactor operation.

16 Claims, 23 Drawing Figures

INVENTORS:
JACK N. FOX
NED P. HANSEN
EUGENE E. OLICH
RALPH W. GUENTHER
HERBERT J. RUBINSTEIN

BY: *John R. Duncan*
ATTORNEY

PATENTED MAY 2 1972 3,660,231

STEAM COOLED NUCLEAR REACTOR

BACKGROUND OF THE INVENTION

Nuclear chain fission reactions and the reactors in which they take place are now well known. A typical reactor includes a chain reacting assembly or core made up of nuclear fuel material contained in fuel elements. The fuel material is generally encased in corrosion resistant heat conductive containers or cladding. The reactor core, made up of a plurality of these fuel elements in spaced relationship, plus control rods or blades, in-core instrumentation, etc., is enclosed in a container or shroud through which the reactor coolant flows. As the coolant passes between the spaced fuel elements, it is heated by thermal energy released in the fuel during the fission reaction. The heated coolant then leaves the reactor, the heat energy is used to perform useful work such as by driving a turbine-generator set to produce electrical power, and the now-cooled coolant is recycled back to the reactor.

In typical commercial power reactors, the coolant is water which may be heated under pressure or evaporated in the core. Recently, reactors have been designed using steam as a coolant. In power plants using reactors of this type, saturated steam enters the reactor and is superheated as it passes through the core. The superheated steam leaves the reactor, is desuperheated and condensed while performing useful work, and is re-evaporated and recycled back to the reactor. This system is preferred for many applications, since steam at high temperatures and pressures is often more useful than the lower temperature steam produced by conventional pressurized water and boiling water reactors. For example, electrical power generating turbines are generally more efficient and economical when driven by superheated rather than saturated steam.

Prior steam cooled reactor designs have been largely a compromise among various conflicting variables. For example, it is desirable that control rods or blades enter the core from the top, so that gravity will aid entry. However, it is desirable that the steam coolant channels be designed for upward flow, so that when the reactor core is shutdown and flooded with water, the water can be circulated using, in part, natural convection (upward) circulation. Upward flow of coolant past the control rods, however, exerts hydraulic forces on the rods which may more than overcome gravitational forces.

In many prior steam cooled reactors it is necessary to direct a portion of the incoming saturated steam through non-fueled elements, such as control rods and instrumentation, to cool them instead of passing through the heat generating core. This is disadvantageous, since the reactor outlet steam temperature is diluted as a result of mixing core outlet steam with steam which has bypassed the core to cool the non-fueled elements.

Where the control rods are arranged for entry into the top of the core, prior arrangements have generally placed the control rod drive system on the reactor pressure vessel head, above the core. However, this arrangement is disadvantageous since it makes head removal and refueling much more difficult.

Various arrangements of reactor internal components, shielding and core flooding water supply have been proposed in the past. While many of these have provided adequate efficiency and reliability, there is a continuing need for improvements in these areas.

SUMMARY OF THE INVENTION

It is, therefore, an object of this invention to provide a steam cooled nuclear reactor overcoming the above-noted problems.

Another object of this invention is to provide a steam cooled nuclear reactor of improved reliability, simplicity and efficiency.

Another object of this invention is to provide a steam cooled nuclear reactor having an improved steam flow arrangement.

Still another object of this invention is to provide a simple and reliable core flooding system.

A further object of this invention is to provide a control system which prevents coolant hydraulic forces from accidentally withdrawing a control rod from the core.

The above objects, and others, are accomplished in accordance with this invention, basically, by providing a steam coolant nuclear reactor including a two-pass steam flow system in which steam flows downwardly past non-fueled core components, such as control rods, reflector and instrumentation and then flows upwardly through the fuel assemblies to be heated. The control rods are top-entry, but with drives entering through the bottom of the reactor. The reactor internals are located within a shroud which forms a second pressure-tight vessel in addition to the main pressure vessel. The annular space between the shroud and the inner wall of the main pressure vessel is water filled, to act both as a neutron-absorber for additional shielding during nuclear operation and as an immediately available source of core-flooding water. Hold-down of the fuel assemblies at the upper end is accomplished by removable orifices which can be replaced without removing a fuel assembly from the core.

While this system, as a whole, is especially useful with a reactor of the fast-neutron steam cooled type, many of the components have utility in other types of reactors, especially those cooled by other gases.

BRIEF DESCRIPTION OF THE DRAWINGS

Details of the invention will be further understood upon reference to the drawings, wherein.

DETAILED DESCRIPTION OF THE INVENTION

Figure 1:
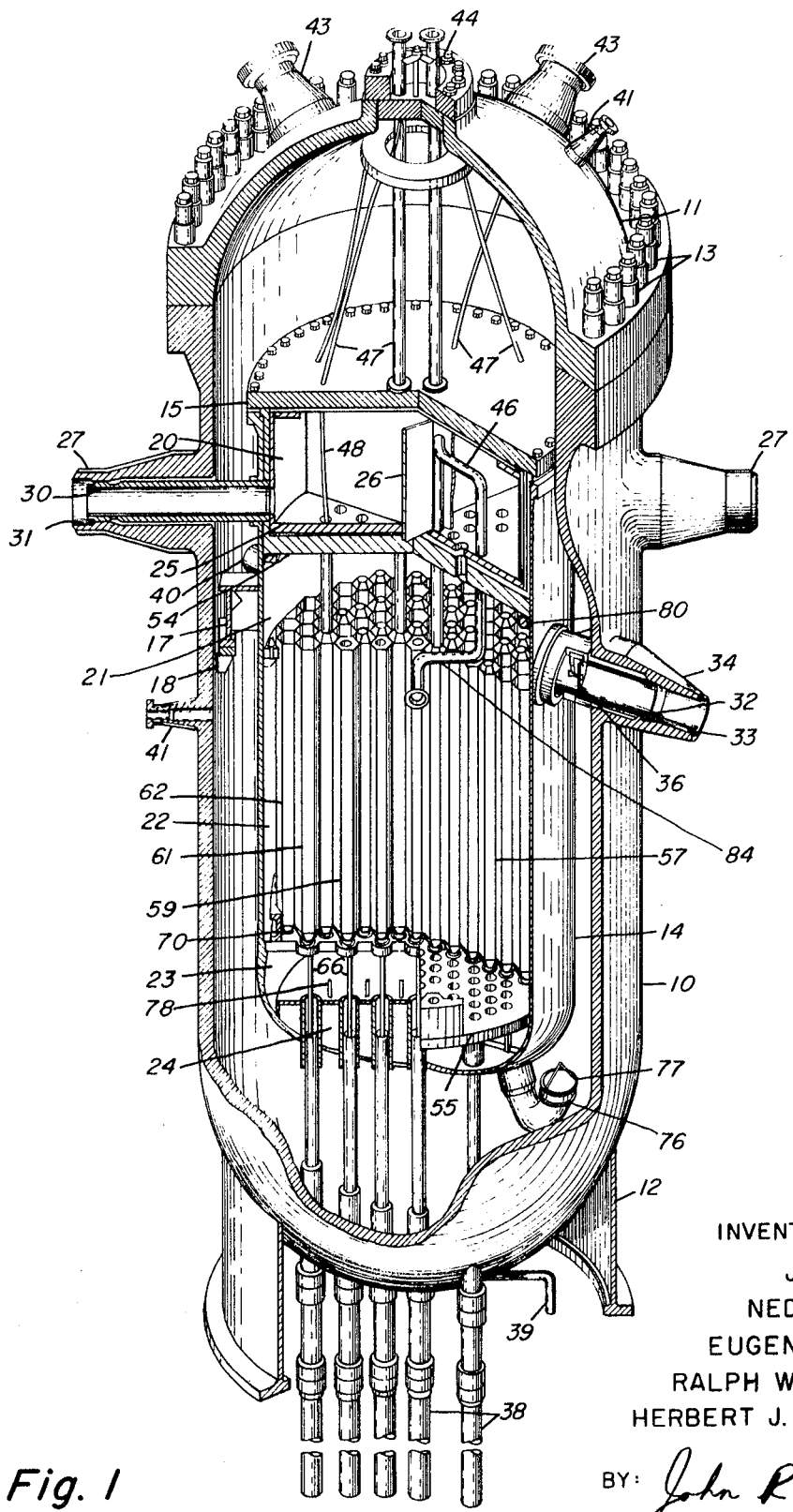
FIG. 1 is an isometric view, partly cut away and somewhat simplified for clarity, of the steam cooled nuclear reactor of this invention.

Referring now to FIG. 1, there is seen a simplified isometric view of a nuclear reactor including an open-topped pressure vessel 10 closed by a head 11. Pressure vessel 10 is supported by a skirt 12 for mounting on a suitable foundation (not shown). Head 11 is secured to pressure vessel 10 by a plurality of bolts 13.

Figure 2:
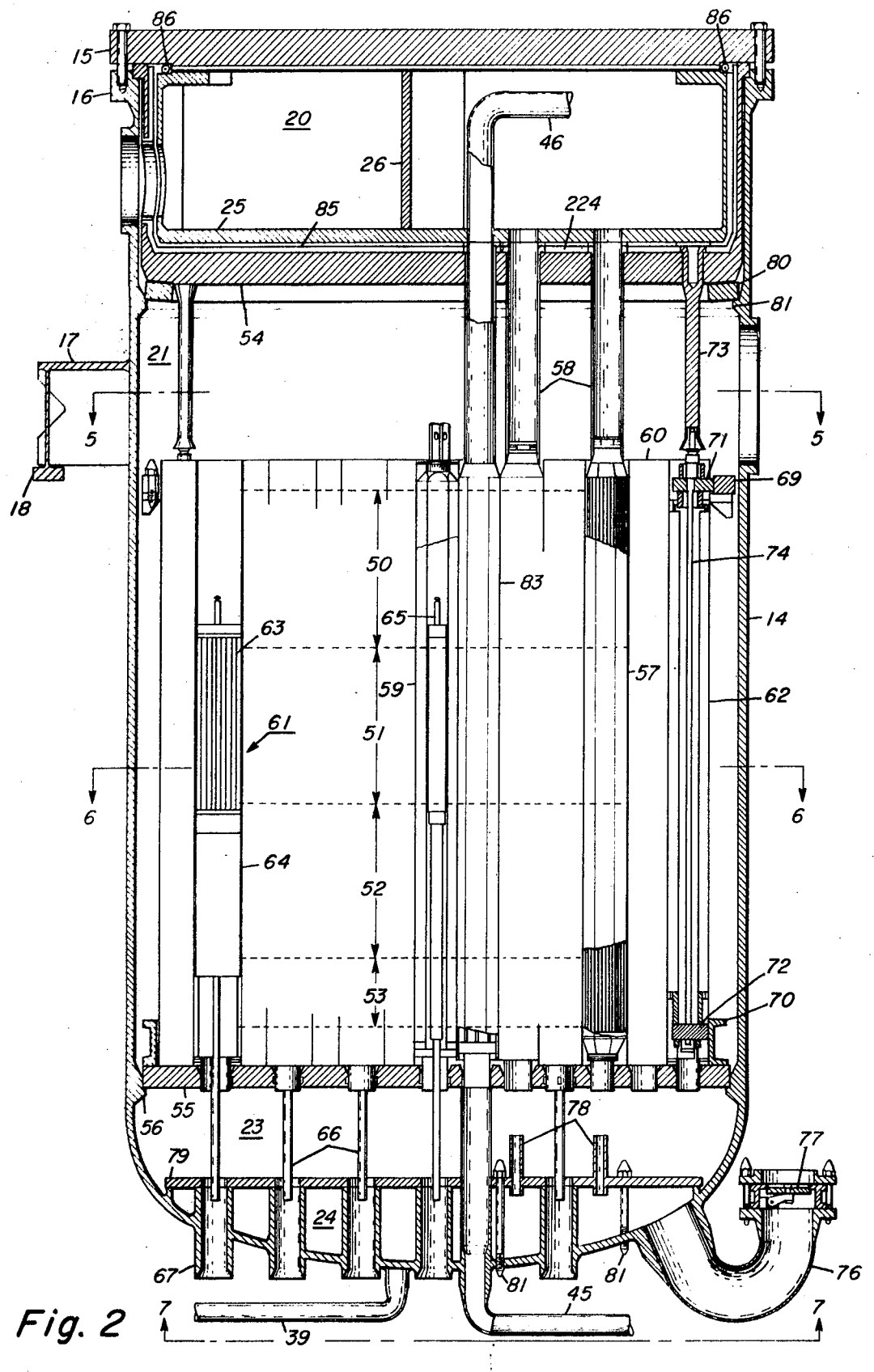
FIG. 2 is a vertical section through the core shroud containing the reactor internal components.

Within pressure vessel 10 is mounted an open-topped shroud 14 closed by a closure flange 15 seated on shoulder 16 (FIG. 2). Shroud 14 is supported by means of flexible box-shaped supports 17 resting on inwardly projecting support pads 18 on the inner wall of pressure vessel 10. Supports 17 are rigidly fastened to support pads 18 so that a small amount of radial flexing in supports 17 is permitted to compensate for differing thermal expansion between shroud 14 and pressure vessel 10 during reactor heat-up and cool-down.

Within shroud 14 are contained a superheated steam outlet plenum 20, a saturated steam inlet plenum 21, a core and blanket space 22, a lower steam plenum 23 and a flooding water inlet plenum 24.

Outlet plenum 20 is closed at the top by closure flange 15 and at the sides and bottom by exhaust divider and hold down 25 which includes vertical dividing plates 26 which divide outlet plenum 20 into a plurality of pie-shaped segments. Holddown 25 is shown in greater detail in FIGS. 3 and 4. Superheated steam leaves each of the plenum segments through individual superheated steam outlets 27. Typically, there may be six plenum segments and six outlets. Each of outlets 27 consists of an inner sleeve 30 secured to shroud 14 and in slidable sealing engagement with an outer sleeve 31. This permits the two sleeves to slide with respect to each other to compensate for differential thermal expansion.

Saturated steam enters inlet plenum 21 through a similar arrangement of slidable inner sleeve 32 secured to shroud 14 within an outer sleeve 33, the combination of which makes up a saturated steam inlet 34. Typically, three such inlets may be arranged to deliver saturated steam to inlet plenum 21. A check valve 36 is located in each inner sleeve 32 to prevent loss of steam through inlet 34 should the saturated steam supply fail for any reason.

A plurality of control rod drives 38 penetrate the bottom of pressure vessel 10 and shroud 14. Only a few of the many control rod drives which would be used in a typical reactor are shown in FIG. 1, for clarity.

The space between the inner wall of pressure vessel 10 and shroud 14 is kept substantially filled with water during reactor operation. This provides neutron shielding and a convenient source of water to flood the core when the reactor is shut down. Water is admitted to this space through a shield and flood water inlet 40. Openings 41 are provided for instruments for monitoring and controlling the water level within pressure vessel 10. A cleanup line 39 is provided at the bottom of pressure vessel 10 to drain water therefrom, when desired.

Instrumentation outlets 43 and seal plug 44 are provided for the admission of steam sample lines, thermocouple connections, etc., into pressure vessel 10.

As is further discussed below, if desired, one test fuel assembly 83 may be provided with an individual saturated steam inlet line 45 (as seen in FIG. 2) and superheated steam outlet line 46 so that special fuel assemblies may be tested during reactor operation.

A plurality of instrumentation leads 47 enter pressure vessel 10 through instrumentation outlets 43 and seal plug 44. As is further indicated below, this reactor is unusually well adapted to permit individual sampling of steam output from each fuel assembly. A typical steam sampling line is shown at 48.

Figure 6:
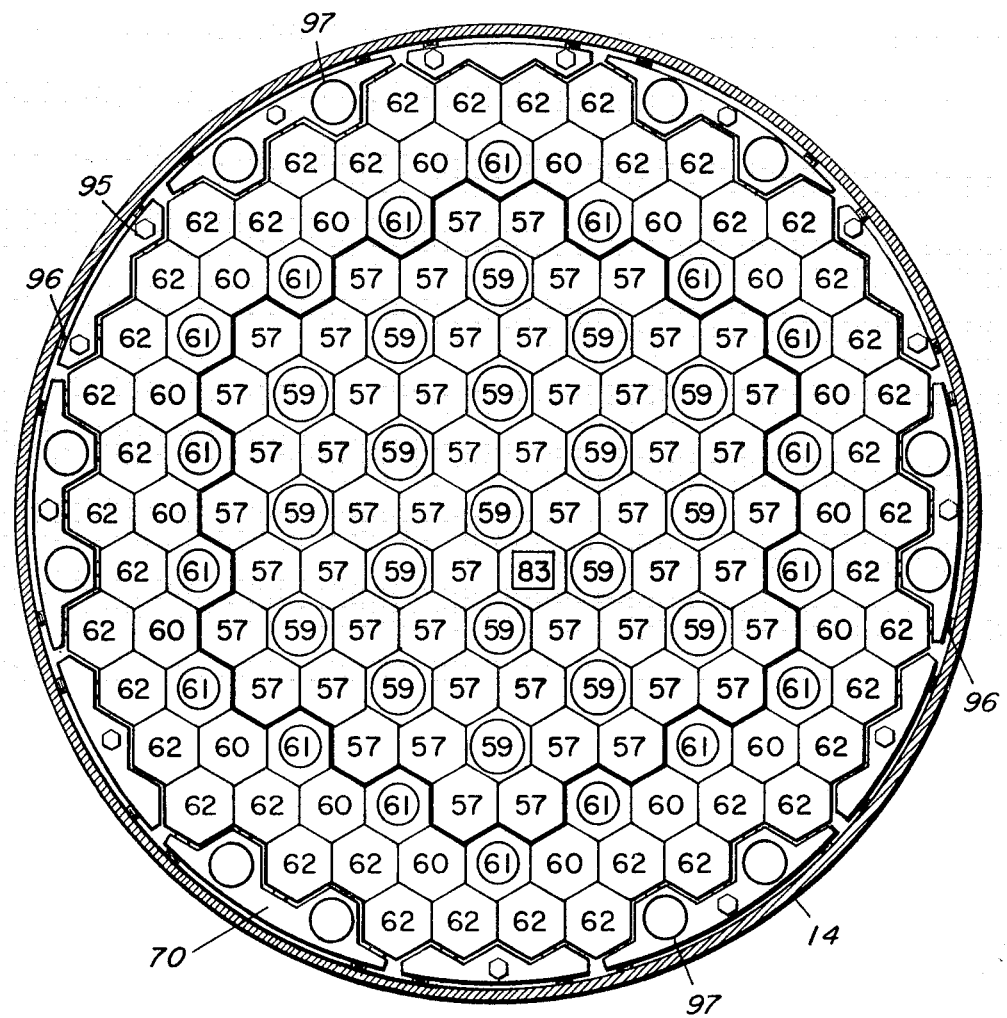
FIG. 6 is a horizontal section taken on line 6—6 in FIG. 2.

Details of the arrangement of components within shroud 14 may best be understood by considering FIGS. 1 and 2 together. FIG. 2 shows a vertical section through shroud 14, somewhat simplified for clarity. While the core and blanket region contains many fuel subassemblies, control rods, reflector assemblies, etc., as seen in FIG. 6, only one of each is detailed in FIG. 2.

The overall reactor core 22 is divided axially into four sections, an upper blanket 50, an active fuel region 51, a lower blanket 52 and a gas plenum region 53. These sections are illustratively divided by dashed lines in FIG. 2. Radially, the overall reactor core 22 is divided into two sections, as best seen in FIG. 6. The central section consists of fuel subassemblies 57 and control assemblies 59 while the outer ring-shaped section consists of reflector assemblies 60, reflector-clamp assemblies 62 and reflector-control assemblies 61.

All of the subassemblies which make up overall core 22, except the fuel subassemblies, are supported at their lower ends by core plate 55, which is in turn supported by an inwardly projecting shoulder 56 on shroud 14. As is further described below, these non-fuel assemblies are primarily made up of multi-rod subassemblies which permit saturated steam to flow downwardly therethrough from inlet plenum 21 to lower steam plenum 23.

Each of the fuel assemblies 57 is secured to an orifice-seal assembly 58 which is suspended from seal plate 54. The fuel assemblies are thus held out of weight-bearing contact with core plate 55, although lower nozzles on the fuel assemblies extend down through holes in core plate 55 in sliding contact therewith. The spacing between the fuel assemblies and core plate 55 allows for thermal expansion of the fuel assemblies during reactor operation.

These orifice-seals 58 and the fuel assembly support system are described in detail and claimed in copending application Ser. No. 779,135, filed concurrently herewith. Fuel assemblies 57 are shown in greater detail in FIG. 8.

Reflector-control assemblies 61 include an upper control section 63 and a lower reflector section 64. Control section 63 includes a plurality of rods of a neutron-absorbing or "poison" material, such as boron carbide. Reflector section 64 includes a plurality of rods of a neutron-reflecting material, such as nickel. In FIG. 2, reflector-control assembly 61 is shown in the maximum control position, with the neutron-absorbing section adjacent fuel region 51. As assembly 61 is moved upwardly, control decreases as the neutron-absorber is replaced by the neutron-reflector. Saturated steam passes downwardly through assembly 61, past the neutron absorbing and reflecting elements. This steam tends to both cool the assembly and aid gravity in moving the control section into the maximum control position. Reflector-control assemblies 61 are shown in greater detail in FIGS. 11, 12 and 13.

Fixed reflector assemblies 60 each consists of a plurality of spaced rods comprising a neutron-reflecting material such as nickel within a hexagonal shroud. Fixed reflector assemblies 60 are shown in greater detail in FIGS. 18–20.

Control assemblies 59 each includes a plurality of spaced rods each containing neutron-moderating material such as beryllium oxide, surrounding a cylindrical sleeve within which a unit 65 made up of several neutron-absorbing rods is movable. Unit 65 is shown in FIG. 2 in the maximum control location. To increase the reactivity within fuel region 51, unit 65 is raised. Saturated steam coolant passes downwardly through each control assembly 59, cooling the assembly and aiding gravity in moving unit 65 into the fuel region in the event of an emergency. Control assemblies 59 are shown in greater detail in FIGS. 9 and 10.

All of control assemblies 59 and reflector-control assemblies 61 are moved by conventional drive means (not shown) which connect to drive rods 66 through thimbles 67.

Around the outside of core 22 is located a ring of reflector-clamp assemblies 62. Around the upper and lower ends of core 22 are located an upper edge plate 69 and a lower edge plate 70, respectively. These plates conform to the irregular cylindrical shape of the core. Within each of the reflector-clamp assemblies 62 is located a plurality of spaced rods made up of a neutron-reflecting material, such as nickel, and a pair of rams 71 and 72, adapted to be moved outwardly against upper and lower edge plates 69 and 70, respectively. As these rams move outwardly, the assembly shrouds are pressed inwardly, clamping core 22 tightly together. This prevents core movement during reactor operation which would result in undesired reactivity changes. A clamp hold-down rod 73 engages the upper edge of a torque rod 74 in each reflector-clamp assembly 62 to hold the assembly in place during reactor operation.

The clamping system is described in further detail in copending U.S. Pat. application Ser. No. 779,000, filed concurrently herewith.

During reactor construction, or after refueling, etc., the core is first assembled as shown. Then seal ring 80 is placed within shroud 14 in engagement with an annular, inwardly-projecting shoulder 81. When seal plate 54 is lowered into place, it engages and deflects the inner edge of seal ring 80. This results in an excellent gas and liquid seal between the wall of shroud 14 and seal plate 54. Orifice seals 58 are lowered into place and the fuel assemblies 51 are raised out of weight-bearing contact with core plate 55 and locked to orifice-seals 58.

Clamp operating tools are brought into engagement with torque rods 74 and are operated to drive rams 71 and 72 outwardly to tightly clamp core 22 together.

Exhaust divider and hold-down 25 is lowered into place. This holds orifice-seals 58 and hold-down rods 73 tightly in place.

While most of the orifice-seals 58 align with openings in hold-down 25 to deliver superheated steam thereinto, one or more may align with an individual test loop cross-over pipe 46. Thus, an individual test fuel assembly may be provided with independent saturated steam inlet 45 and superheated steam cross-over pipe 46. While in a strictly power reactor this test loop may be eliminated, this reactor design is exceptionally well adapted to having such a test facility included.

Thermal insulation may be provided in space 85 to decrease heat transfer from superheated steam outlet plenum 20 to saturated steam inlet plenum 21, if desired.

Finally, closure flange 15 is installed. A plurality of rollers 86 are provided between closure flange 15 and exhaust divider and hold-down 25 to permit pressure contact while allowing for differential thermal expansion.

As described above, when internal pressure within shroud 14 drops below a pre-set value, as during an emergency or during reactor shutdown, the core is automatically flooded with water. One of several flooding valve assemblies 76 is shown in FIGS. 1 and 2. When shroud internal pressure drops, check valve 77 opens, admitting water into flooding water inlet plenum 24. A plurality of flooding nozzles 78 are arranged on closure plate 79, in alignment with the fuel assemblies in core 22. Plate 79 is held in place by a plurality of bolts 81. Slight leakage through the shroud into plenum 24 is immaterial, since both spaces are water-filled. Nozzles 78 immediately direct flooding water into the fuel assemblies to immediately begin cooling them. Since the flow of steam coolant during reactor operation is upward through the fuel assemblies, it is not necessary to reverse coolant flow during flooding. Also, flow of water through the fuel assemblies in the upward direction is aided by natural convection.

Figure 3:
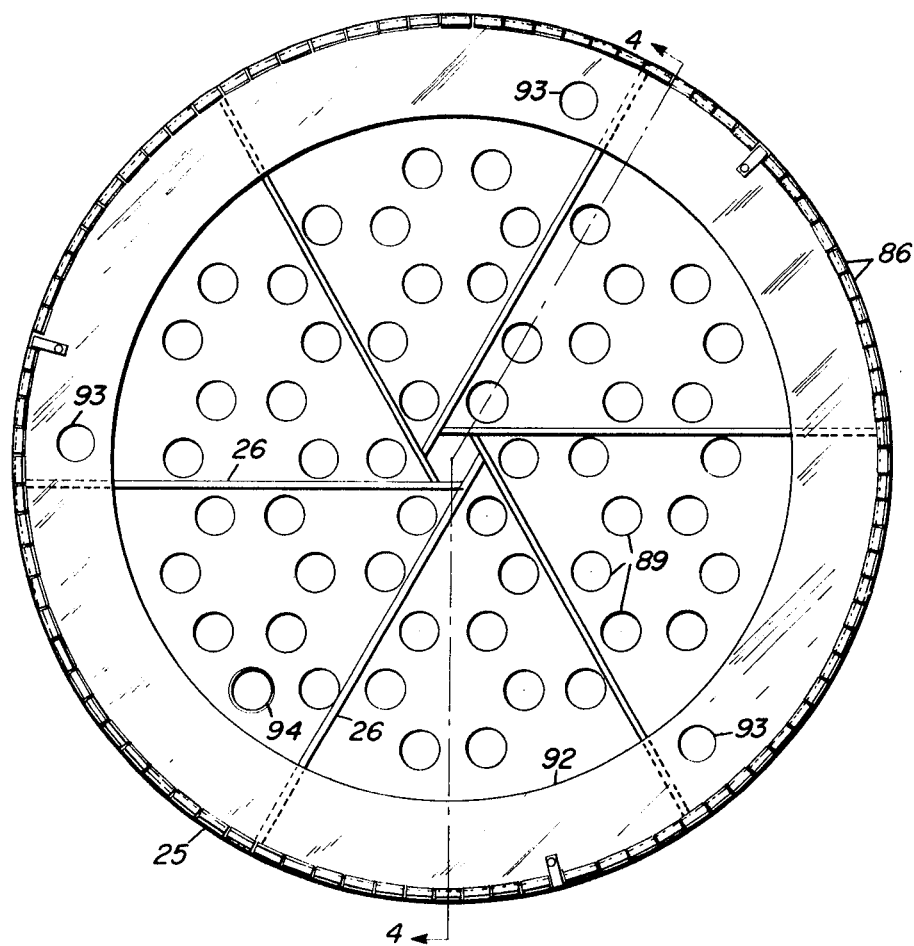
FIG. 3 is a plan view of the exhaust divider and hold-down device.
Figure 4:
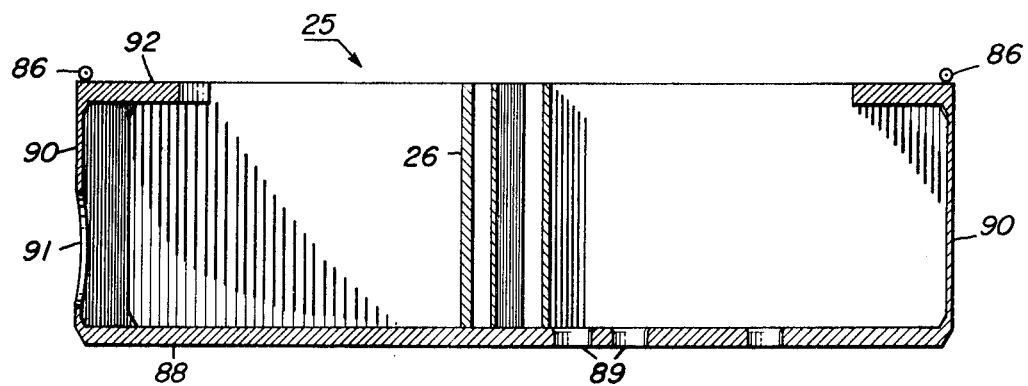
FIG. 4 is a vertical section through the exhaust divider and hold-down device shown in FIG. 3, taken on line 4—4 in FIG. 3.

FIGS. 3 and 4 show further details of exhaust divider and hold-down 25. A plan view is seen in FIG. 3, while FIG. 4 shows a section through FIG. 3 taken on line 4—4.

Hold-down 25 includes a hold-down plate 88 which serves to hold orifice seals 58 and hold-down rods 73 in position (as seen in FIG. 2) while permitting superheated steam from orifice-seals 58 to enter through a plurality of openings 89. An upstanding cylindrical wall 90 around the edge of plate 89 includes steam outlet openings 91. A flange 92 at the top of wall 91 bears against closure flange 15 through rollers 86. Thus, the rings of bolts holding closure plate 15 to shroud 14 supplies the ultimate force holding exhaust divider and hold-down 25 in place. Flange 92 includes several holes 93 for connecting crane hooks when lifting hold-down 25 into and out of shroud 14. The interior of hold-down 25 is divided into six approximately pie-shaped segments by dividers 26. Each segment aligns with one of the outlet openings 91 and one of the superheated steam outlets 27. Of course, if desired, the outlet plenum 21 could be divided in some other number of segments, such as three by merely eliminating every other divider 26.

An extra opening through plate 88 is provided at 94 for the test loop outlet 46 from test fuel assembly 83 (as seen in FIG. 1) if such a loop is included in the reactor.

This unique cooperation between orifice-seals 58 and divided outlet plenum 20 permits simple division of steam output from different parts of core 22. Thus, if fission products should leak into the coolant stream from failed fuel rods in one section of core 22, steam from that section could be easily prevented from reaching plant equipment. Instead, the contaminated steam would be used to evaporate feedwater (as a major portion of the steam output is used anyway in a "Loeffler" type steam cycle). Then the contaminated steam could be passed through a demineralizing and decontamination system.

Figure 5:
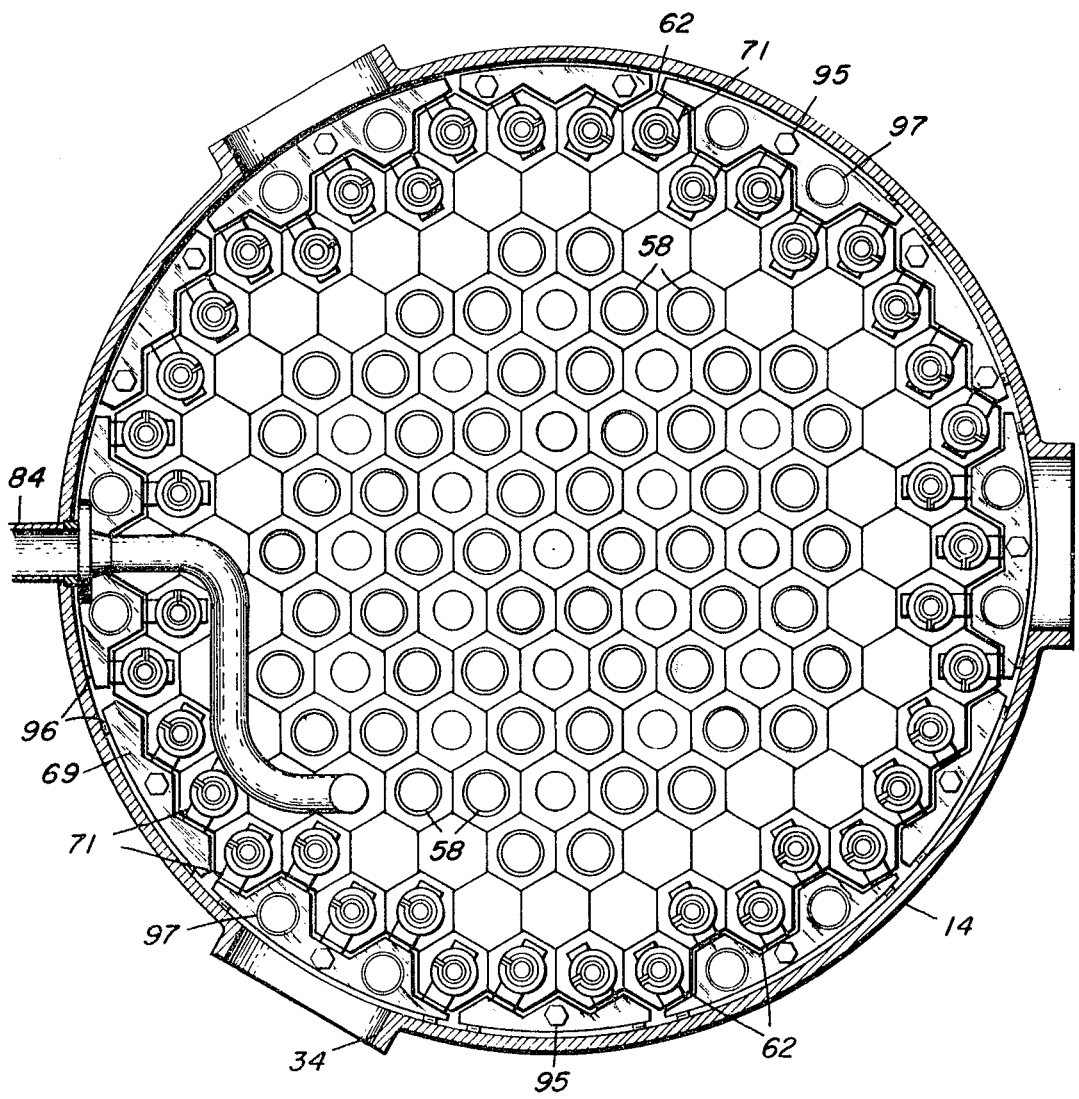
FIG. 5 is a horizontal section through the core shroud, taken on line 5—5 in FIG. 2.

Details of the saturated steam inlet plenum 21 will be further understood upon reference to FIG. 5 which shows a horizontal section through shroud 14 taken on line 5—5 in FIG. 2.

As seen in FIG. 5, the overall core is clamped in position by a plurality of reflector-clamp assemblies 62 which includes movable rams 71 which bear against an interrupted upper edge plate 69 secured to the inner wall of shroud 14 by a plurality of adjustable bolts 96.

A plurality of down-flow tubes 97 pass through edge plates 69 and 70 to aid in conducting saturated steam from saturated steam inlet plenum 21 to lower steam plenum 23. These tubes are sized so that part of the saturated steam passes downwardly through the non-fuel core assemblies (e.g., control and reflector assemblies) and part through the down-flow tubes.

Saturated supply steam enters shroud 14 through three spaced inlets 34.

Each fuel assembly 57 includes an individual orifice-seal 58 which conveys superheated steam from the individual fuel assembly to outlet plenum 20.

The cross-sectional arrangement of the various core components is further shown in FIG. 6, which is a horizontal section through shroud 14 taken on line 6—6 in FIG. 2.

This typical overall core 22 includes 54 fuel assemblies, 53 of which are regular fuel assemblies 57 and one of which is a test fuel assembly 83. Of course, if desired in a strictly power plant reactor, all of the fuel assemblies could be conventional and the test loop could be eliminated. Conversely, if desired, additional test loops could be easily added to this reactor.

A heavy black line schematically separates the fuel region from the radial reflector region. In addition to the fuel assemblies 57, the fuel region includes 19 control assemblies 59 which include both neutron moderating and neutron absorbing material. The reflector region includes 18 reflector-control assemblies 61, 18 stationary reflector assemblies 60 and 42 reflector-clamp assemblies 62.

The reflector-clamp assemblies include lower rams 72 which bear against interrupted lower edge plate 70, as seen in FIG. 2, to aid in tightly clamping core 22 together. Down-flow tubes 97 pass through lower edge plate 70 to lower steam plenum 23.

Figure 7:
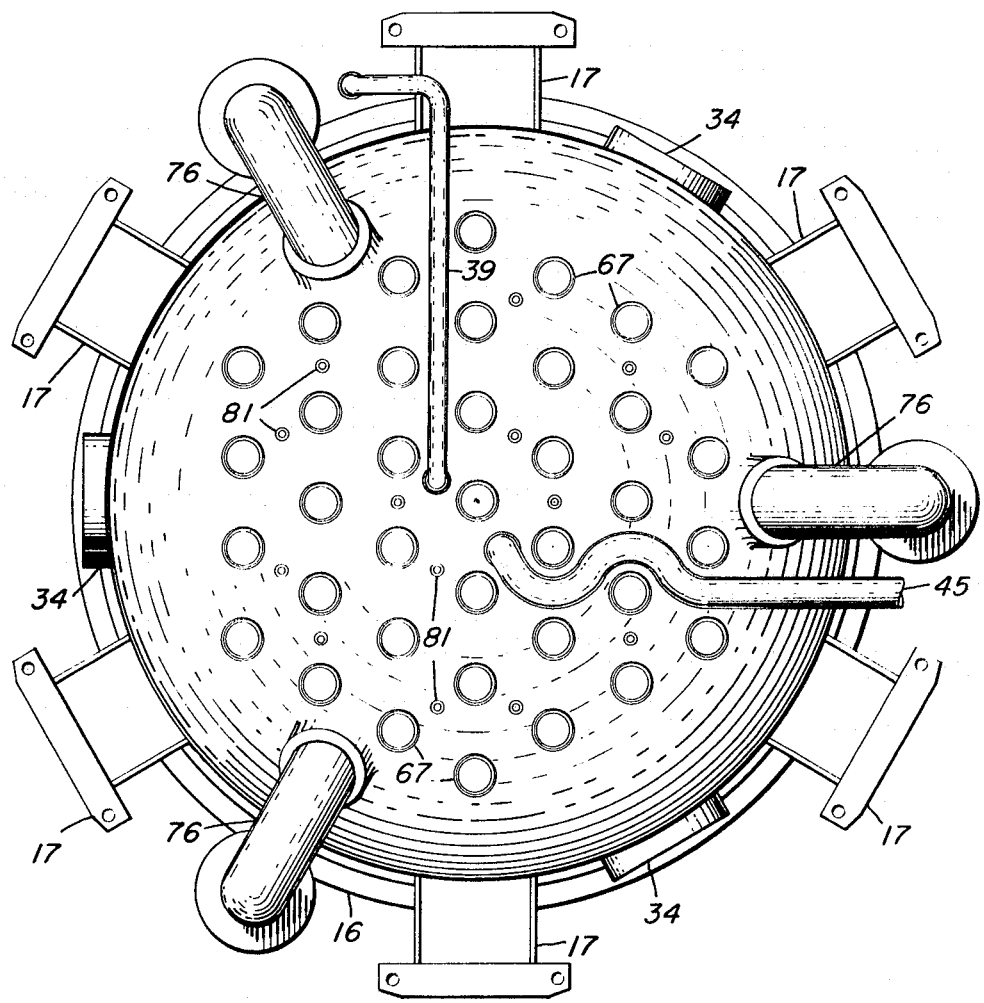
FIG. 7 is a plan view of the core shroud, taken upwardly from below the core shroud as indicated by line 7—7.

FIG. 7 shows shroud 14 looking upwardly from below. Shroud 14 is supported by six annular supports 17 which engage projections on the inner wall of pressure vessel 10 as seen in FIG. 2. Three saturated steam inlets 34 are visible in FIG. 7, while the six superheated steam outlets 27 are hidden, since they are directly above supports 17.

Three core flooding valve assemblies 76 are spaced around the bottom of shroud 14. A plurality of control rod drive thimbles 67 penetrate shroud 14 in alignment with control assemblies 59 and reflector-control assemblies 61. A drain line 39 and a saturated steam inlet line 45 for the test fuel assembly are routed between thimbles 67. Bolts 81 which hold closure plate 79 in position penetrate the bottom of shroud 14.

Figure 8:
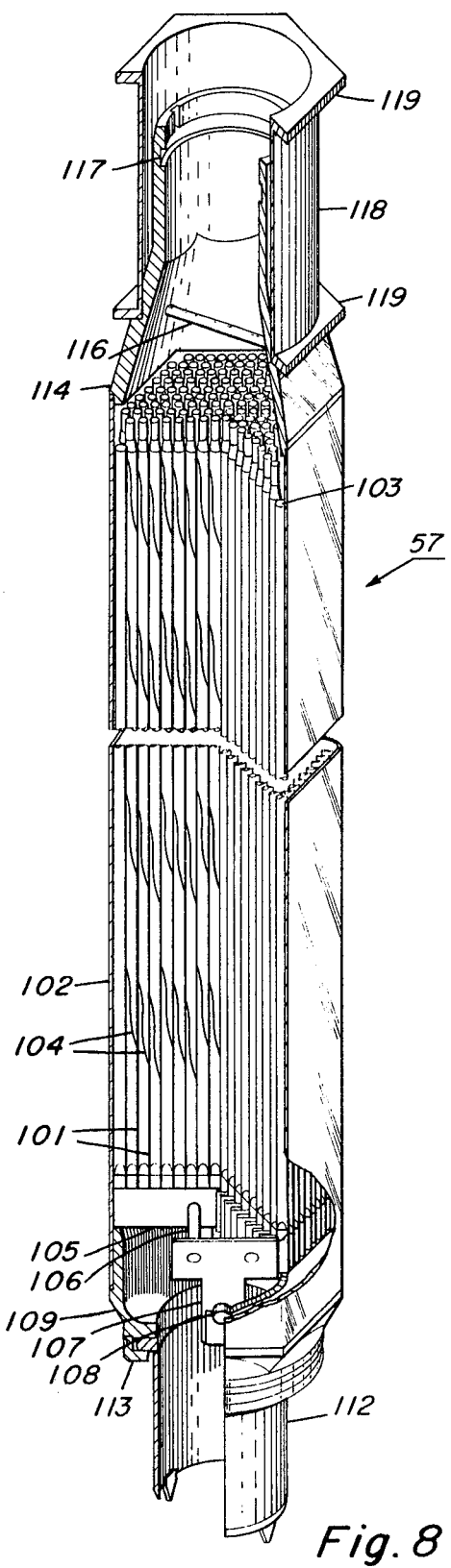
FIG. 8 is an isometric view of a typical fuel assembly, partly cut away and shortened for clarity.

FIG. 8 shows an isometric view of a fuel assembly 57 suitable for use in the reactor of the invention.

Each fuel bundle 57 comprises a plurality of fuel rods 101 within a hexagonal shroud 102. Typically, a fuel assembly may contain 265 fuel rods, plus six dummy rods 103 at the shroud corners to permit a substantial corner radius to reduce stress concentrations in the wall of shroud 102.

Each of fuel rods 101 consists of closed tubes of a cladding material such as Incoloy-800, containing a column of oxide fuel pellets containing fissile and fertile isotopes. A typical fuel rod may have an outside diameter of about 0.228 inch and a length of about 65 inches. This length includes, from the top of the core, a two-inch upper spring to hold the fuel pellets in place, an 18-inch upper blanket region, an 18-inch core region, an 18-inch lower blanket region and an 8-inch gas plenum at the lower end to collect fission gases. Locating the fission gas plenum at the core inlet minimizes the pressure drop penalty because of the lower steam velocity and permits the use of a shorter gas plenum since fission gas temperature will be lower adjacent to the core inlet. Each rod has an about 0.045 inch diameter spiral wire wrap 104 on about a 6-inch pitch to provide lateral spacing. If desired, each fuel rod may have a roughened, turbulence promoting exterior surface to increase heat transfer.

The portions of the fuel rods which extends through upper blanket 50 and lower blanket 52 (FIG. 2) may contain a fertile material such as depleted $UO_2$ or natural $UO_2$, while within fuel region 51, the pins may contain enriched $UO_2$ and $PuO_2$.

Fuel rods 101 are supported by a plurality of parallel spaced support plates 105 to which fuel pins 101 are welded. A pair of transverse bars 106 hold support plates 105 in parallel relationship. Several of the support plates have downwardly extending portions 107 which are fastened by pins 108 to a lower transition casting 109 which is secured to shroud 102. A lower nozzle 112, held to transition casting 109 by a retaining ring 113, is adapted to slidingly fit in an opening in core plate 55 (FIG. 2). Nozzle 112 is slidingly held to transition casting 109 by retaining ring 113 to permit relative radial clamping movement. The fuel rods are preferably supported at the bottom end because the temperature and velocity are lower at the inlet and because the hydraulic forces during normal reactor operation is greater than the weight of the fuel so that the fuel pins will be in axial tension during operation.

Secured to the upper end of shroud 102 is an upper nozzle 114. A transverse lifting rod 116 is provided so that fuel bundle 57 may be lifted into engagement with orifice-seal 58 (as seen in FIG. 2). A locking groove 117 is provided in nozzle 114 for "bayonet" type engagement with orifice-seal 58. A thermal sleeve 118 with turbulence baffles 119 is provided around nozzle 114 to reduce the temperature gradients and thermal stresses in this portion of fuel bundle 57.

Superheated steam from each fuel assembly 57 passes through an individual orifice-seal 58 to outlet plenum 20. Thus, steam sampling lines 48 which enter the reactor pressure vessel through instrumentation outlets 43 or seal plug 44 and extend down into each orifice-seal 58 can sample steam just as it exits each fuel assembly 57. This permits the immediate detection and location of failures in fuel rods during reactor operation which release fission products into the coolant stream.

While fuel bundles of the sort shown in FIG. 8 are especially suitable for use in the reactor of this invention, any other suitable design may be used. For example, if desired, powdered or granular rather than pelleted fuel material could be used, the fuel assembly could have a cross-section other than hexagonal and the fuel pins could be held in spaced relationship by spacers other than the spiral wires shown.

Figure 9:
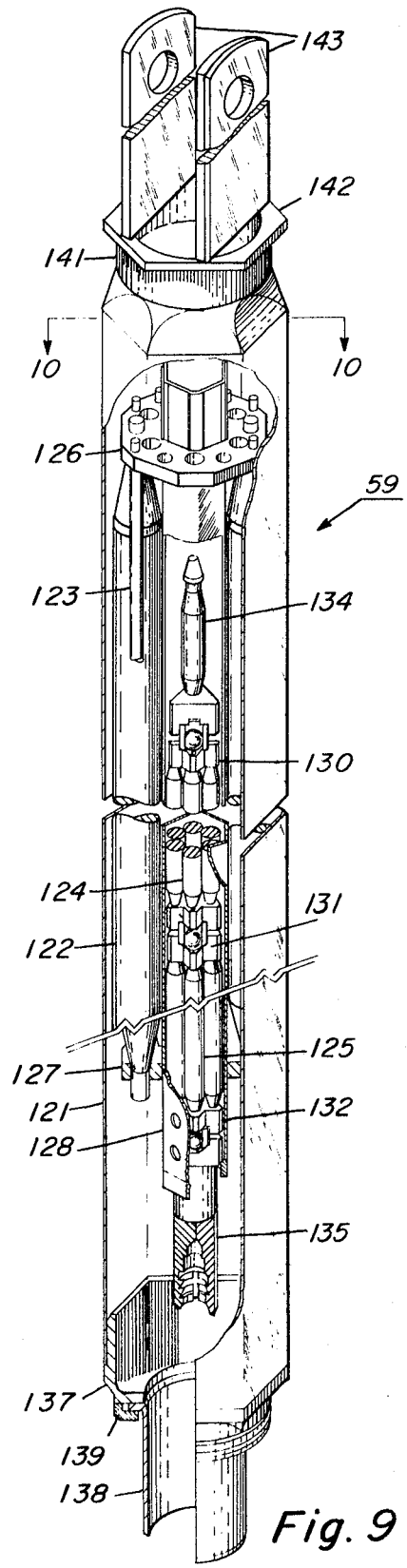
FIG. 9 is an isometric view of a typical control rod assembly, partly cut away.

FIG. 9 shows an isometric view, partly cut-away, of a control assembly 59. This assembly is contained within a hexagonal shroud 121 generally similar to fuel assembly shroud 102.

Control assembly 59 includes 6 fixed moderator rods 122, 6 fixed thermal poison rods 123 and 7 movable poison rods 124.

Typically, moderator rods 122 may comprise beryllium oxide, fixed poison rods 123 may comprise europium oxide and movable poison rods 124 may comprise tantalum. Each of the rods is desirably encased in a suitable cladding material, such as Incoloy-800. Fixed rods 122 and 123 are supported by upper and lower rod mounting plates 126 and 127, which are secured to shroud 121 and which also support an inner sleeve 128.

Within sleeve 128 the seven movable poison rods 124 are arranged for vertical movement. Seven follower rods 125 containing, for example, aluminum oxide or zirconium oxide, are provided which move into fuel region 51 (as seen in FIG. 2) when movable poison rods 124 are moved upwardly out of said region. The ends of these rod assemblies 124 and 125 are secured to end adapters 130, 131 and 132, each of which includes roller means bearing on the inner wall of sleeve 128.

An extractor rod 134 is fastened to upper end adapter 130 to permit the removal of the movable poison rods 124 and follower rods 125 from the top of the control assembly, if necessary. A drive connector 135 is provided on lower end adapter 132 to which the control rod drive means (not shown) may be connected. Any suitable conventional drive means may be used, as desired. Typical conventional drives are described in U.S. Pat. No. 3,020,887, for example.

The lower end of shroud 121 is provided with a lower transition casting 137, and a nozzle 138 which is adapted to slidingly fit holes in core plate 55 (as seen in FIG. 2). Nozzle 138 is secured to transition casting 137 by a retaining ring 139 which permits slight relative transverse movement between nozzle 138 and shroud 121.

The upper end of shroud 121 is provided with an upper transition casting 141, a turbulence baffle 142 and lifting plates 143.

Figure 10:
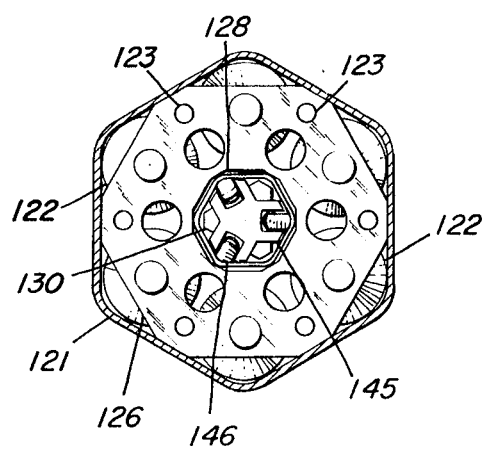
FIG. 10 is a section through the control rod assembly, taken on line 10—10 in FIG. 9.

The arrangement of moderating and poison rods, and guide rollers within control assembly 59 is further illustrated in FIG. 10, which is a horizontal section taken on line 10—10 in FIG. 9, with extractor rod 134 and the upper half of upper end adapter 130 removed, for clarity. Upper rod mounting plate 126 within shroud 121 supports the ends of the six fixed moderating rods 122 and the six fixed poison rods 123. Secured within plate 126 is inner sleeve 128. Upper end adapter 130 carries a spider 145 on which three rollers 146 are mounted for rolling contact with the inner wall of sleeve 128. This permits the movable poison rods 124 to be easily moved vertically within sleeve 126.

While other suitable control assemblies may be used, if desired, the above described assembly has been found to be especially effective in the reactor system of this invention. The Doppler effect, relating to increasing neutron absorption with increasing temperature, is a useful safety factor in large fast reactors. The moderating material in rods 122 is included to increase the magnitude of the Doppler coefficient. The magnitude of the Doppler coefficient becomes larger as moderator is added because of the increased low energy flux. A material such as europium oxide is included in the fixed poison rods 123 to tailor the flooding reactivity effect. Reactivity increases when the core is flooded with water due to the moderating effect of the water and the increased thermalization of fast neutrons present. Europium decreases the flooding reactivity due to the preferential low energy neutron absorption cross section as the neutron spectrum is softened by the addition of water to the core.

Figure 11:
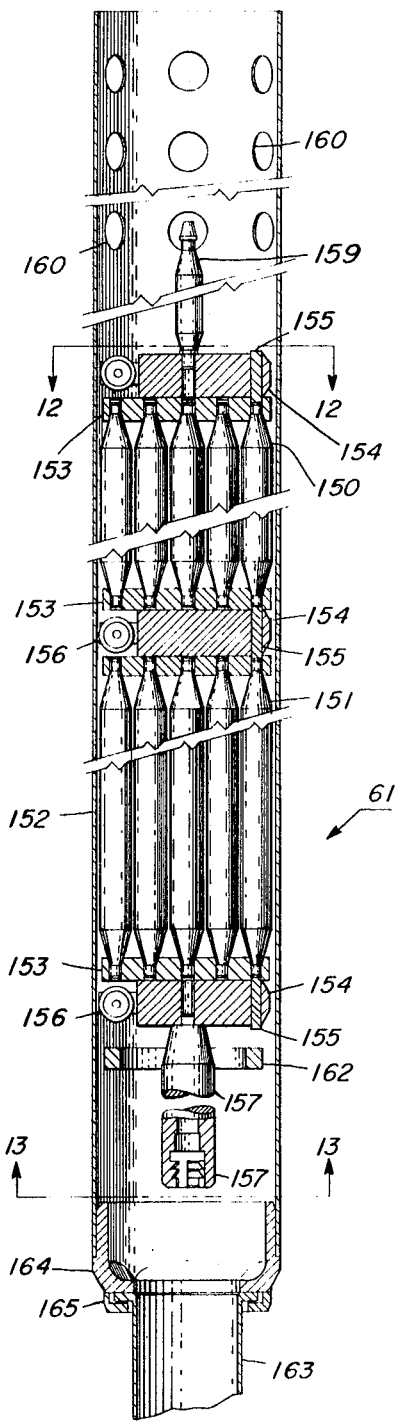
FIG. 11 is a vertical section through a typical reflector-control assembly, partly cut away.

A vertical section through a typical reflector-control assembly 61 is shown in FIG. 11, somewhat shortened for clarity. A plurality of poison rods 150 and reflector follower rods 151 are arranged for vertical movement as a unit within shroud 152. Typically, there are 19 poison rods 150, each comprising a material such as tantalum or boron carbide which has a high neutron absorption cross section. Follower rods 151 comprise a neutron reflecting material, such as nickel.

Figure 12:
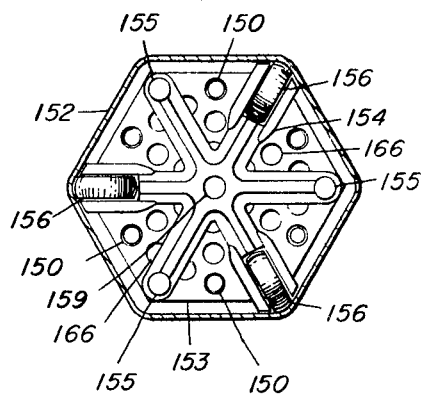
FIG. 12 is a section through the reflector-control assembly, taken on line 12—12 in FIG. 11.

Four support plates 153 hold the poison and follower rods in parallel alignment. Support plates 153 are secured to a three wheel spider 154 by pins 155 and suitable spot welds. Each wheel spider 154 carries three wheels or rollers 156 as best seen in FIG. 12, which ride in every other corner of hexagonal shroud 152 during vertical movement of the control and reflector rods. The lowest wheel spider 154 is secured to a drive connector 157. The control drive means (not shown) is removably fastened to drive connector 157 during reactor operation. An extractor rod 159 is secured to upper wheel spider 154 so that the control and reflector rod assembly may be lifted from above, when desired.

Shroud 152 is perforated in the upper region with a plurality of holes 160 to aid coolant circulation through the assembly. A nozzle 163, adapted to fit slidingly in a hole in core plate 55, is fastened to shroud 152 by a transition casting 164 and retaining ring 165 which permits slight relative transverse movement between nozzle 163 and shroud 152.

Figure 13:
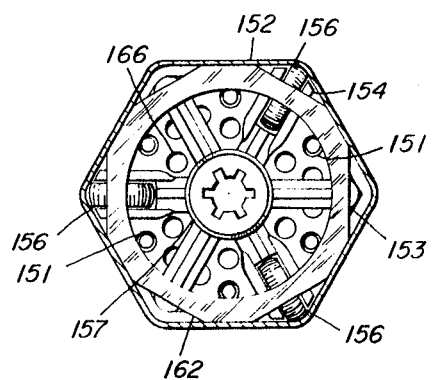
FIG. 13 is a section through the reflector-control assembly, taken on line 13—13 in FIG. 11.

FIGS. 12 and 13 show further details of the arrangement of wheel spiders 154. As seen in FIGS. 11 and 13, a stop ring 162 is provided to limit downward movement of the control and reflector assembly. Support plates 153 include a plurality of holes which receive the ends of poison control rods 150 and reflector rods 151 and a plurality of open holes 166 through which coolant flows downwardly through the assembly.

FIGS. 14–17 show several views of reflector-clamp assemblies 62. The assembly is contained within a shroud 170 which is in general identical with those surrounding the other in-core assemblies described above.

Figure 14:
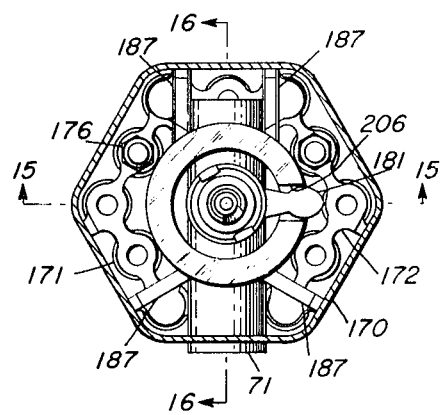
FIG. 14 is a plan view of a typical fixed reflector-core clamp assembly.
Figure 15:
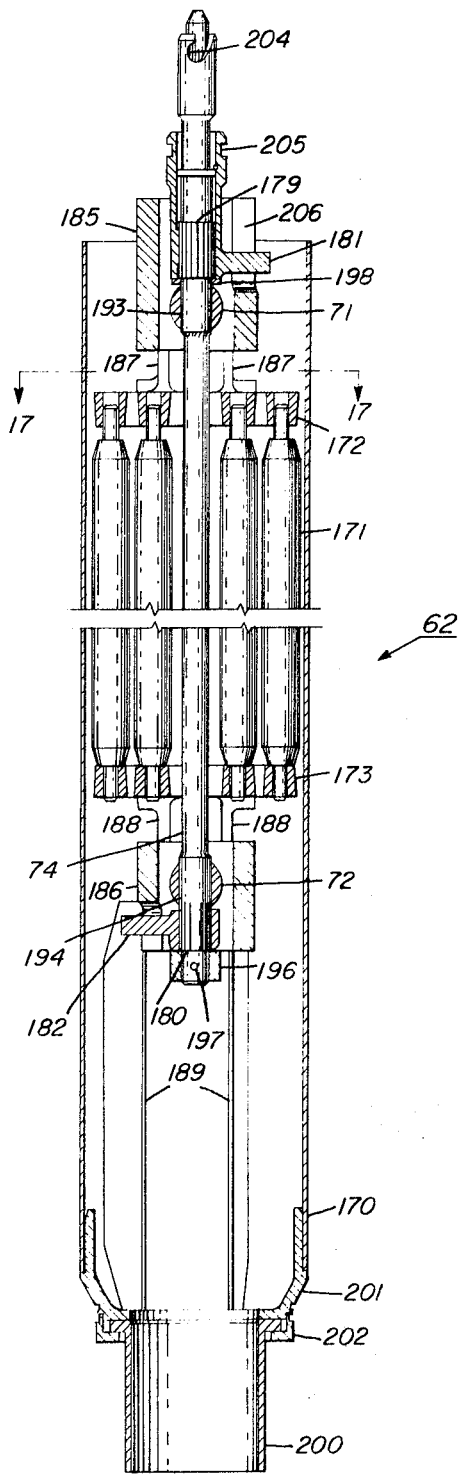
FIG. 15 is a vertical section through the fixed reflector-core clamp assembly taken on line 15—15 in FIG. 14.
Figure 16:
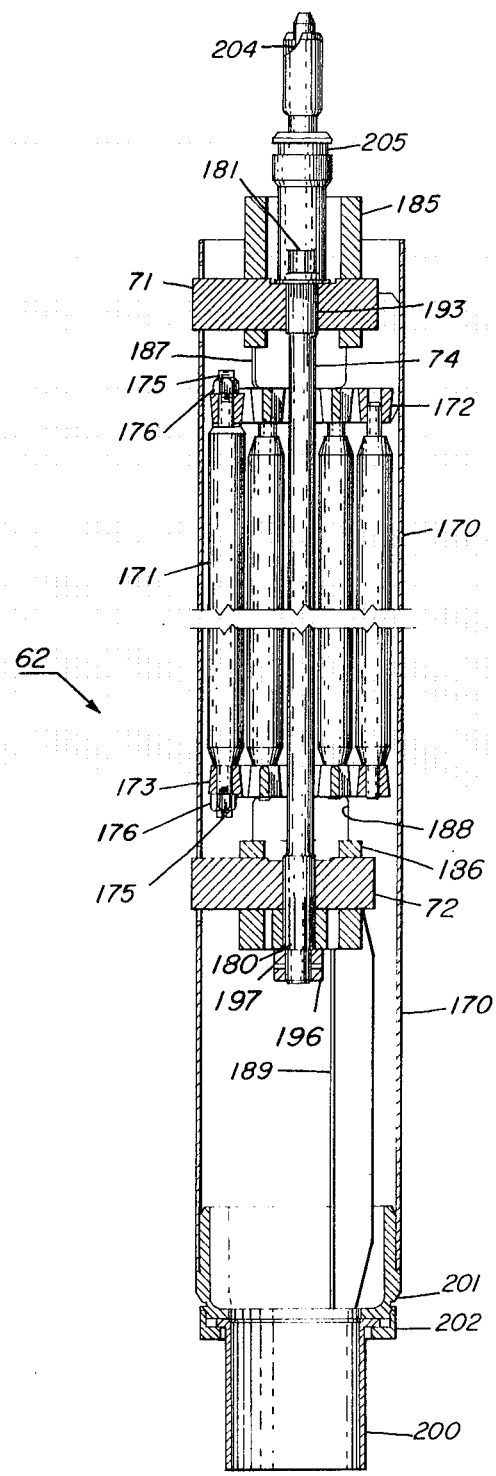
FIG. 16 is a vertical section through the fixed reflector-core clamp assembly taken on line 16—16 in FIG. 14.
Figure 17:
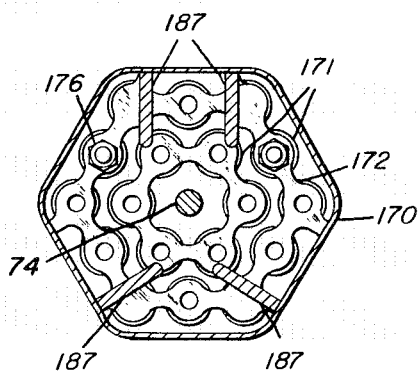
FIG. 17 is a horizontal section through the fixed reflector-core clamp assembly taken on lines 17—17 in FIG. 15.

A plurality (typically, 18) of reflector rods 171 (typically, nickel rods) extending through the upper blanket, fuel region and lower blanket, are rigidly held between upper end plate 172 and lower end plate 173 within shroud 170. These end plates 172 and 173, as seen in FIGS. 14 and 17, are cut-away to allow coolant to pass downwardly through the rod assembly. Several of the reflector rods 171 have threaded end portions 175 extending through end plates 172 and 173. Nuts 176 threaded onto end portions 175 hold the end plates in the desired spaced relationship.

A torque rod 74 extends downward through the center of the reflector rod assembly. Upper and lower splined portions 179 and 180 on torque rod 74 engage upper foot 181 and lower foot 182, respectively. Feet 181 and 182 are located within upper and lower stub tubes 185 and 186. Upper stub tube 185 is fixed to support members 187 which are fixed to upper end plage 172. Similarly, lower stub tube 186 is fixed to lower end plate 173 by support members 188. Lower stub tube is further held in place by several spaced support bars 189.

An upper ram 71 and a lower ram 72 are slidably positioned in transverse openings through upper and lower stub tubes 185 and 186, respectively. Torque rod 74 passes through openings 193 and 194 in rams 71 and 72. Torque rod 74 is held in position by a lower ring 196 pinned by pin 197 to the lower end of the rod and upper ring 198 which abuts a shoulder formed by upper spline 179.

In use, the reflector-clamp assemblies 62 are inserted into the core, with nozzle 200 inserted in an opening in core plate 55 as seen in FIG. 2. Nozzle 200 is secured to shroud 170 by a transition casting 201 and retaining ring 202, in the same manner as the other in-core assemblies, described above.

A tool (not shown) which includes an inner member formed to engage notch 204 in the upper end of torque rod 74 and an outer sleeve adapted to engage bayonet locking means 205 on the upper and of upper foot 181. The tool sleeve is raised, raising upper foot 181 so that spline 179 is disengaged. Then the tool inner member is rotated, twisting torque rod 74. The tool sleeve is lowered, engaging spline 179 and the tool is then removed. Torque in torque rod 74 causes the transverse projections on feet 181 and 182 to press against the wall of slots 206 and 207 in upper and lower stub tubes 185 and 186. This forces torque rod 74 slightly off-center, moving rams 71 and 72 toward upper and lower edge plates 69 and 70, as seen in FIGS. 2 and 11–13. This ram movement is very slight, on the order of about three-eighths inch, since the in-core assemblies have only slight clearance before clamping. This clamping system, and a clamp actuating tool, are described in further detail in copending U.S. Pat. application Ser. No. 779,000, filed concurrently herewith.

Any other suitable reflector assembly and core clamping system may be used if desired. However, reflector-lamp assembly 62 is especially preferred, since it combines both functions in a single compact assembly.

Figure 18:
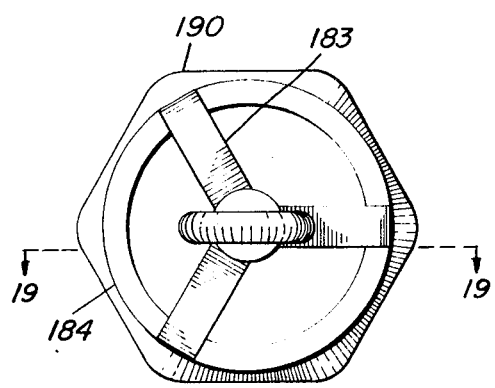
FIG. 18 is a plan view of a typical fixed reflector assembly.
Figure 19:
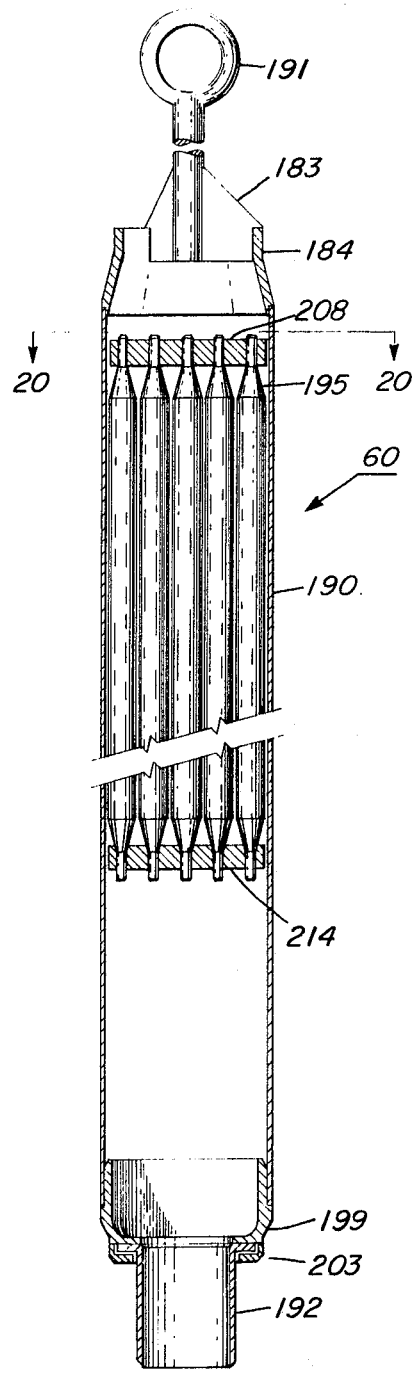
FIG. 19 is a vertical section through the fixed reflector assembly taken on line 19—19 in FIG. 18.
Figure 20:
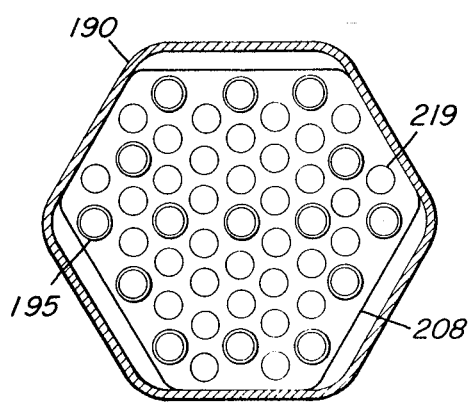
FIG. 20 is a horizontal section through the fixed reflector assembly taken on line 20—20 in FIG. 19.

Reflector assemblies 60 are shown in detail in FIGS. 18, 19 and 20. FIG. 18 shows a plan view of the fixed reflector while FIG. 19 shows a vertical section through the assembly taken on line 19—19 in FIG. 18 and FIG. 20 shows a horizontal section taken on line 20—20 in FIG. 19, showing in detail the arrangement of the reflector rod mounting plates.

As seen in FIGS. 18 and 19, reflector assemblies 60 are housed in an elongated hexagonal shroud 190 which is generally similar to the shrouds surrounding the other core component assemblies. A lifting ring 191 is provided at the upper end of shroud 190 to permit easy insertion and removal of the assembly. Lifting ring 191 is secured to shroud 190 by means of three support bars 183 and a transition casting 184. A nozzle 192 at the lower end of shroud 190 is secured to shroud 190 by means of a transition casting 199 and a retaining ring 203. A flange on nozzle 192 fits slidingly between retaining ring 203 and transition casting 199 to permit slight relative transverse movement of shroud 190 with respect to nozzle 192 as clearances between core assemblies are taken up by the above-described core clamping system.

A plurality, typically 19, of reflector rods 195 (typically nickel rods) are positioned within shroud 190 and extend between an upper end plate 208 and a lower end plate 214. These reflector rods extend through the upper blanket 50, fuel region 51 and lower blanket 52 as seen in FIG. 2. End plates 208 and 214 are secured to the inner wall of shroud 190 and hold reflector rods 195 in position. As seen in FIG. 20, the end plates retain the ends of the reflector rods 195 in a plurality of spaced holes. Between the reflector rod supporting holes are a plurality of coolant flow holes 219. Also, some portions of the plates are cut-away adjacent to the inner wall of shroud 190 therebetween. Thus, during reactor operation coolant flows into the assembly, downwardly past the reflector rods to cool them and then exits through nozzle 192.

While any other suitable fixed reflector assembly may be used if desired, the assembly shown in FIGS. 18–20 is simple and effective and is therefore preferred for use in the system of this invention.

Figure 21:
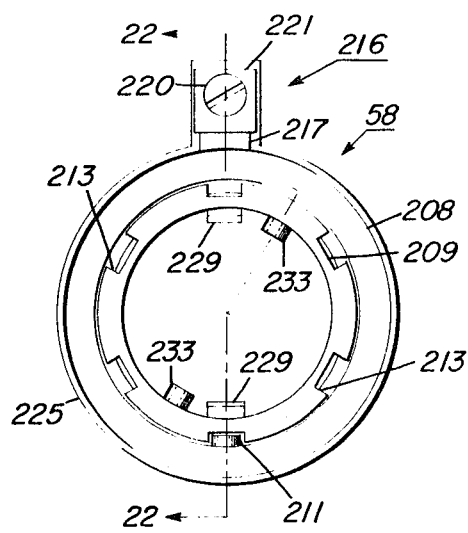
FIG. 21 is a plan view of a typical orifice-seal assembly.
Figure 22:
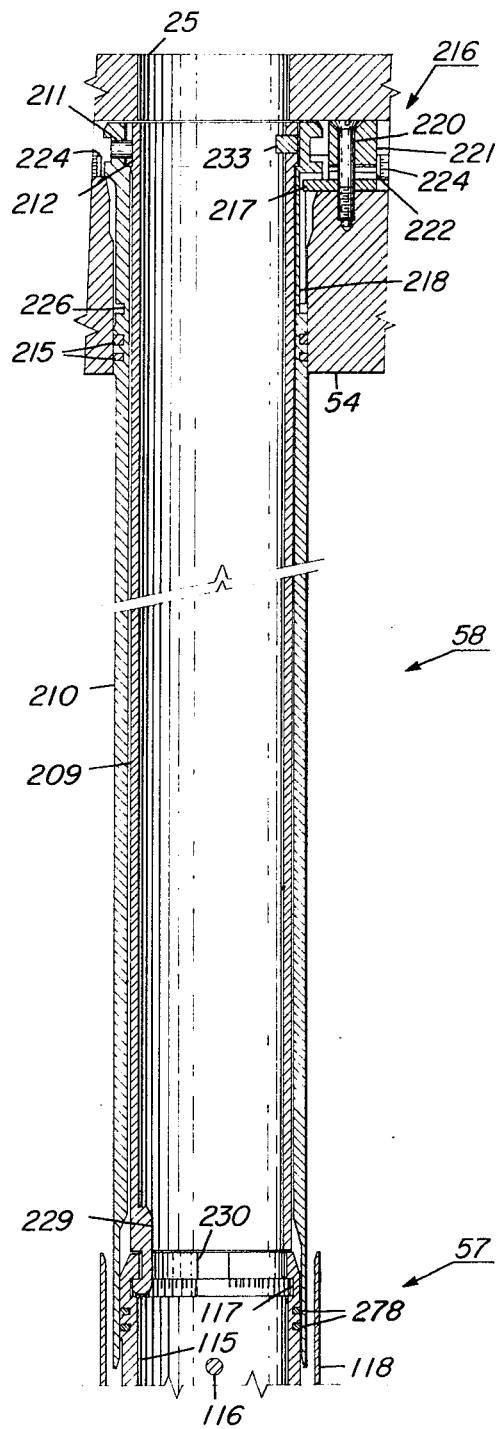
FIG. 22 is a vertical section through a typical orifice-seal assembly taken on line 22—22 in FIG. 21.

FIG. 21 shows a plan view of a typical orifice-seal assembly 58. FIG. 22 shows a vertical section through the orifice-seal taken on line 22—22 in FIG. 21, including portions of a fuel assembly 57, seal plate 54 and exhaust divider and hold-down 25 to which the orifice-seal 58 is secured during reactor operation.

As seen in FIGS. 21 and 22, orifice-seal 58 consists of an inner orifice tube 209 and an outer seal tube 210. Tubes 209 and 210 are assembled together and a pin 211 extending from tube 210 into one of several axial slots 213 in tube 209. A plurality of vertical slots 213 in tube 209 connect with groove 212 to permit the tubes to be assembled in any of several suitable positions.

In use, orifice-seal 58 is placed in an opening in seal plate 54. Compressible rings 215, in the nature of piston rings, seal the space between the outer surface of seal tube 210 and the opening.

A key assembly 216 is installed to prevent accidental complete removal of orifice-seal 58, and to hold orifice-seal 58 in a partially inserted position as desired.

Key assembly 216 includes a key member 217 which extends into a vertical groove 218 in the outer wall of seal tube 210. Key member 217 is held in place by a flat-headed bolt 220 which extends through a block 221, shims 222 and key member 217 into seal plate 54. Key assembly 216 thus functions both to hold orifice-seal 58 in position and also to space hold-down 25 from seal plate 54 to provide the proper clearance between hold-down 25 and the top surface of orifice-seal 58, to accommodate thermal expansion during reactor operation.

At least part of the space between seal plate 54 and hold-down 25 is filled by a layer of thermal insulation material 224, which is cut away where orifice-seal 58 and key assembly 216 projects above seal plate 54. This cut-out in insulation 224 is indicated by line 225 in FIG. 22.

Vertical groove 218 in which the end of key member 217 rides terminates in a circumferential groove 226. Thus, with key assembly 216 in place, orifice-seal 58 can be only partially removed. If orifice-seal 58 is lifted until the end of key member 217 enters groove 226 then rotated and released, it will be supported in this position by key member 217.

Means is provided at the lower end of orifice-seal 58 for engaging the upper nozzle 115 of a typical fuel assembly 57. Seal tube 210 fits around nozzle 115 and is sealed thereto by compressible rings 278 in circumferential grooves in the outer wall of nozzle 115. A pair of bayonet keys 229 on the lower inner wall of orifice tube 209 pass through vertical grooves 230 in the inner wall of nozzle 115. This engagement is accomplished by a simple tool (not shown) which is inserted down within orifice tube 209. An inner rod gripper within the tool engages transverse lifting rod 116 within nozzle 115. Fuel bundle 57 is lifted so that lugs 229 pass through grooves 230. Then a sleeve in the tool surrounding the lifting rod is rotated in engagement with pins 233 on the inner wall of orifice tube 209 to rotate tube 209, thus causing the ends of lugs 209 to move into circumferential groove 117. The tool may then be removed, leaving fuel assembly 57 suspended from orifice tube 209. Typically, the fuel assembly is lifted about 3/8 inch, to allow for thermal expansion during reactor operation.

The installation and operation of orifice-seal 58 is further detailed in copending U.S. Pat. application Ser. No. 779,135, filed concurrently herewith. While the fuel assemblies may be supported by other means and outlet steam may be carried by other devices, this orifice-seal system is preferred for use in the reactor of this invention, since it is simple, easily operated, and allows for fuel assembly thermal expansion during reactor operation.

Figure 23:
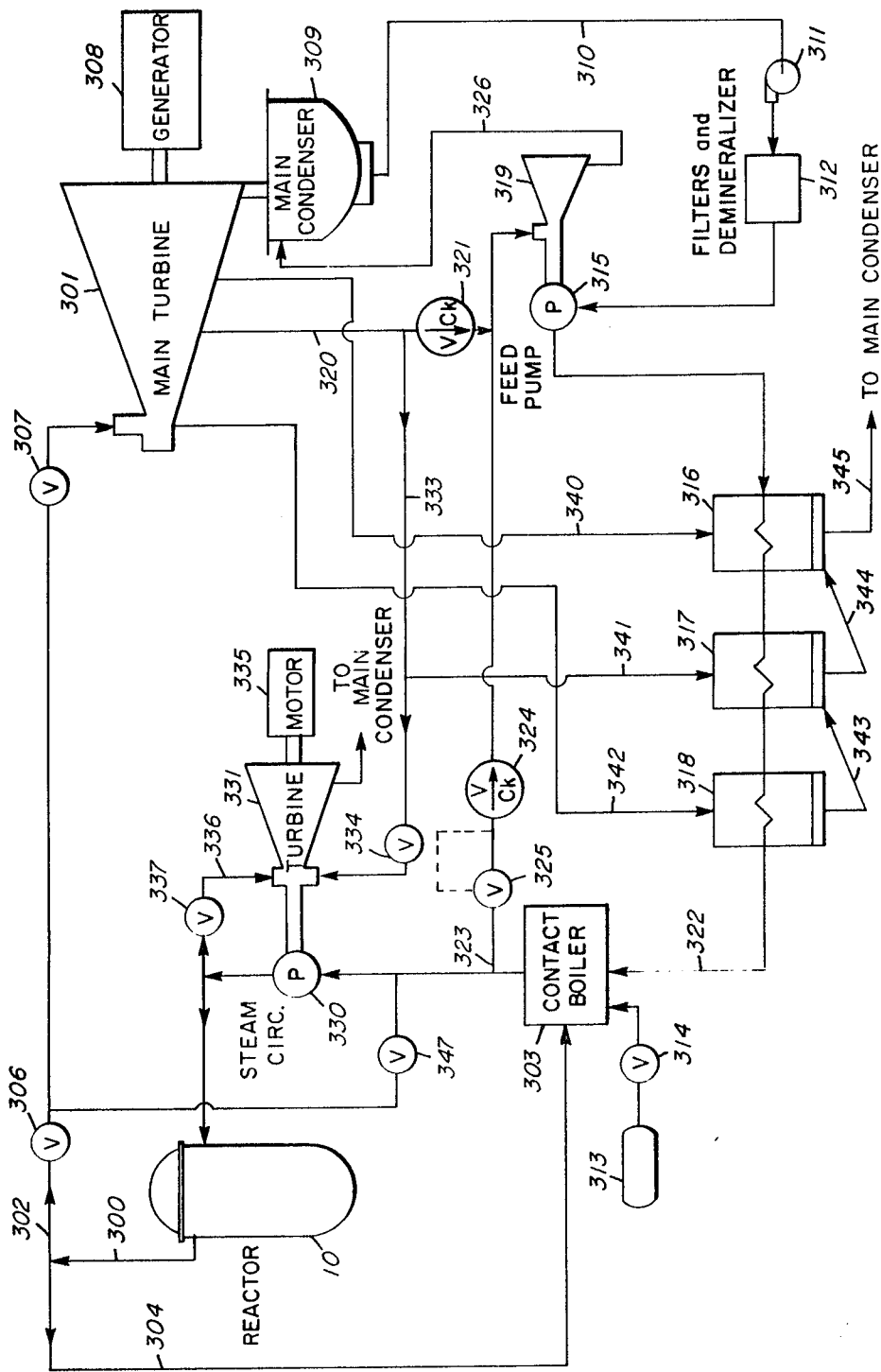
FIG. 23 is a simple schematic illustration of a typical electrical power generating system incorporating the reactor of this invention.

FIG. 23 shows a simple schematic representation of an electrical power generating plant for which the reactor of this invention is especially suitable.

Superheated steam leaves reactor 10 through line 300, which divides the flow into two streams, part going to main turbine 301 through line 302 and part to contact boiler 303 through line 304. Since steam exits reactor 10 through six superheated steam outlet lines 27, as seen in FIG. 1, and since only about 25–33 percent of the steam goes to main turbine 301, only a few of outlets 27 may be connected directly to line 302, if desired. Thus, should fuel in one section of the reactor begin to leak fission products into the stream, outlet steam from that segment may be routed to contact boiler 303 instead of turbine 301, to minimize contamination of turbine 301 and its associated piping and equipment. Steam decontamination means such as described in U.S. Pat. No. 3,400,048, may be included in conjunction with contact boiler 303, if desired.

Valves 306 and 307 control the division of steam between main turbine 301 and contact boiler 303.

Steam passes through main turbine 301, driving generator 308, then is condensed in main condenser 309. Condensate leaves main condenser 309 through line 310 and is pumped through a filter and demineralizer assembly 312 by pump 311.

A typical filtration and demineralization assembly 312 would include three parallel half-sized cellulose cartridge filter elements (two in operation normally and the other serving as a standby), to remove suspended solids and corrosion products. Ionized contaminants are removed in a demineralizer which typically includes a 3–4 foot deep cation-anion resin bed. Spent resin may be regenerated or discarded, as desired.

Water exiting assembly 312 is pumped by a turbine driven boiler feed pump 315 through three feedwater heaters 316, 317 and 318 to contact boiler 303 through line 322. Boiler feed pump turbine 319 is driven by extraction stream from turbine 301 through line 320 or from contact boiler 303 through line 323. Since steam output from contact boiler 303 varies during start-up, a control valve 325 is provided which senses steam flow through line 323 and passes the desired quantity to turbine 319. A check valve 324 is provided in line 323 to prevent steam back-up during regular reactor operation. Exhaust from turbine 319 passes to main condenser 309 through line 326.

Feedwater entering contact boiler 303 through line 322 contacts superheated steam entering through line 304. The feedwater is evaporated while desuperheating the steam to produce a large quantity of saturated steam. This saturated steam is pumped back to reactor 10 by turbine driven steam circulator 330. During normal reactor operation steam circulator drive turbine 331 is driven by extraction steam from main turbine 301 through line 333 and valve 334. During light main turbine load conditions, steam may be taken from a higher extraction point on main turbine 301. During start-up, steam circulator 330 may be driven by a motor 335 on the shaft of turbine 331, and steam may be admitted to turbine 331 from steam circulator 330 through line 336 and valve 337.

Steam for reactor start-up is produced in backup coolant tank 313 and introduced into contact boiler 303 under control of start-up steam valve 314 during reactor start-up. These tanks 313 also provide an emergency source of coolant in the event of extremely low flow through the steam recirculation loops or in the event of a pipe-rupture accident. Each coolant tank may be maintained at or above the discharge pressure of the steam circulator by either the electrical start-up heater or by a heat exchanger (not shown) on the superheat steam line.

Feedwater heaters 316, 317 and 318 are provided with extraction steam from main turbine 301 through lines 340, 341 and 342, respectively. Exhaust from feedwater heater 318 is flashed back to heater 317 through line 343. Similarly, exhaust from feedwater 317 is flashed back to heater 316 through line 344. Exhaust from feedwater heater 316 passes to main condenser 309 through line 345. While three feedwater heaters are shown, any other suitable number may be used.

In the arrangement described above, main turbine 301 is driven by superheated steam. If it is desired to drive main turbine 301 with saturated steam, normally-closed valve 347 in line 348 is opened and valve 306 is closed. A portion of the saturated steam leaving contact boiler 303 is thus routed directly to main turbine 301, while all of the superheated steam leaving reactor 10 passes to contact boiler 303. This permits washing and decontamination of all of the steam before it reaches main turbine 301.

While a single set of feedwater heaters, contact boiler and steam circulator is shown in the simplified schematic representation of FIG. 23, it is often preferred to have three sets of these components arranged in parallel. Then, if one component is down for repair, the other two sets will be capable of maintaining reactor operation and power generation at reduced capacity.

The reactor system of this invention may be used in any suitable system which is capable of utilizing the superheated output steam and of returning the necessary saturated feed steam. In addition to generation of electrical power, the output could be used by chemical process equipment, heating equipment, etc. The over-all system described above, however, is preferred since it is simple, reliable and capable of effectively using the superheated steam generating capability of the reactor system of this invention.

OPERATION

This reactor system is uniquely adapted to simple and convenient refueling, reactor start-up and operation.

In order to refuel the reactor, the reactor is first shut-down followed by lowering the steam pressure and flooding the core (and the closed loop, if any) with water through check valves 76. The core is cooled and reactor internal pressure is reduced to atmospheric. The various instrumented leads passing through the reactor seal plug 44 and instrumentation outlet 43 are disconnected and capped. The reactor head is lifted off after all of the nuts on the studs holding reactor head 11 is in place are removed.

Closure flange 15 is lifted away after the screws holding it in place are removed. The closed-loop cross-over pipe within outlet plenum 27 may then be lifted away, since it is not fastened in place. A sling is fastened to lifting holes 93 in exhaust divider and hold-down 25 and it is lifted up and away. Core clamp hold-down 73 and orifice-seals 58 are now exposed and accessible.

The core clamp hold-down 73 are removed and torque in torque rods 74 is released by inserting a tool into engagement with the end of each torque rod 74 to disengage spline 179 and release the clamping torque, as seen in FIGS. 14–17.

Each fuel assembly 57 is then disconnected from each corresponding orifice-seal 58 by inserting a tool within inner orifice tube 209 to disengage lugs 229 from nozzle 115. As seen in FIGS. 18 and 19, each orifice-seal 58 is raised and rotated so that key member 217 enters groove 226, thus supporting the orifice-seal in the raised position. This position permits visual inspection to assure that all fuel assemblies have been disconnected and that seal plate 54 is ready for removal. Seal plate 54, carrying all of the orifice-seals 58, is then lifted up and away.

The overall core is now exposed, ready for refueling. Assemblies to be removed are lifted up and carried to a storage rack. Other fuel assemblies may be re-arranged as desired and new assemblies inserted. When the reactor is first fueled, all of the assemblies (control, reflector, fuel, etc.) are inserted, with control assemblies inserted first.

After refueling (or initial fueling) seal plate 54 is placed in position, and all orifice-seals 58 are connected to corresponding fuel assemblies 57. Visual observation that all orifice-seals are in the lowered position assures that all connections have been made. Next, all core clamps are tightened and core clamp hold-downs are installed.

The exhaust divider and hold-down 25 is installed, followed by the closed loop cross-over pipe, closure flange 15 and reactor head 11. Instrumentation is connected and the reactor is ready for testing and start-up.

During reactor shut-down periods, cooling water is circulated through the core to remove heat generated by decaying isotopes in the fuel material. Start-up is begun by heating this water while maintaining water flow and increasing reactor pressure. The initial heat-up may be accomplished by electrical heaters in the backup coolant supply tanks. After the backup coolant tanks 313 have been preheated until pressure therein reaches start-up steam from the tank is introduced directly into contact boiler 303, heating the recirculating contact boiler water. Preferably, the start-up steam flow rate will be controlled with start-up steam valve 314 to provide a circulating water temperature rise of approximately 100° F per hour.

As system temperature and pressure rise, a small quantity of steam will start to flow through turbine 331, turning circulator 330 at low speed. Continued system pressure rise will slowly increase the speed of drive turbine 331 and the head developed by the circulator. At a system pressure of about 100–150 psia, sufficient head will be developed to start steam flow in a small amount to mix and flow through the core with the recirculating water. Starting motor 335 now increases core steam flow to completely unflood the core. Cooling water recirculating pumps sending water to the inlet 40 may then be stopped and valves 76 close to complete unflooding.

After unflooding is completed, system heat-up continues until operating pressure is established. Then the control rods are withdrawn slowly while observing core flux changes. The steam flow throughout the approach to criticality is preferably maintained at about one-half of rated operation. As criticality is achieved, power level is increased until, at about 25 percent of full power, steam is admitted to main turbine 301. The system may then be brought up to full power. Normal shutdown is essentially the reverse of the above start-up procedure.

Although specific arrangements of components and certain preferred components, such as specific fuel assembly, and control assembly designs, have been described in conjunction with the above detailed description of the invention, other suitable arrangements and components may be used as indicated above with similar results.

Other modifications and ramifications of the present invention will occur to those skilled in the art upon reading the present disclosure. These are intended to be included within the scope of this invention.

We claim:

1. An electrical power generating system including a steam cooled nuclear reactor producing superheated steam; means to pass a fixed portion of said superheated steam to steam utilization means; means to pass a second portion of said superheated steam to at least one contact boiler; at least one turbine drive pump means to pump condensate from said utilization means to said contact boiler wherein said condensate is evaporated and said second portion of said superheated steam is desuperheated, producing a large quantity of substantially saturated steam; and at least one turbine driven steam circulator to pump said saturated steam back to said reactor for resuperheating; said reactor comprising a core comprising a plurality of fuel assemblies containing fissile fuel, and a plurality of control assemblies containing neutron absorption material interspersed among said fuel assemblies, an inlet plenum located at one end of said core to receive steam from said steam circulator, means directing said steam through said control assemblies from said inlet plenum to an intermediate steam plenum at the other end of said core, and means directing said steam from said intermediate plenum through said fuel assemblies to an outlet plenum whereby said steam is superheated.

2. The reactor of claim 1 wherein said means directing said steam from said intermediate plenum to said outlet plenum includes a plurality of tubular members passing through said inlet plenum and connecting each fuel assembly with said outlet plenum in fluid flow relationship.

3. The reactor of claim 1 wherein said outlet plenum is divided into a plurality of segments, each segment receiving superheated steam from a portion of said fuel assemblies and each segment including an individual means permitting said superheated steam to leave said reactor.

4. The reactor of claim 1 wherein said core comprises a substantially right cylindrical array of closely packed hexagonal assemblies, with fuel assemblies and control assemblies adjacent the core axis surrounded by a ring-shaped array of reflector and reflector-control assemblies; the outermost ring of reflector assemblies including clamping means adapted to tightly clamp said assemblies together.

5. The reactor according to claim 1 further including an independent saturated steam inlet line and an independent superheated steam outlet line connected in fluid flow relationship to a single fuel assembly whereby said lines and fuel assembly constitute an isolated test loop.

6. The reactor of claim 1 wherein said control assemblies include neutron poison material containing portions adapted to be moved between a position within the active fuel region to a position above said active fuel region and drive means located below said reactor to move said portions between said positions; whereby hydraulic forces resulting from steam passing through said control assemblies between said inlet plenum and said intermediate plenum tend to move said portions into said active fuel region.

7. The reactor of claim 1 wherein said core, said inlet plenum, said intermediate plenum and said outlet plenum are contained within a pressure tight shroud surrounded by a shield water space within a reactor pressure vessel.

8. The reactor according to claim 7 further including a flooding water plenum located adjacent said intermediate plenum within said shroud, valve means adapted to admit water from said shield water space to said flooding water plenum, and a plurality of nozzles positioned to direct flooding water from said flooding water plenum directly into each fuel assembly.

9. In a nuclear power generating system comprising a nuclear reactor producing superheated steam, a main turbine driven by a first portion of said steam, a main condenser for condensing exhaust from said main turbine; a turbine driven pump to pump condensate from said main condenser through a series of feedwater heaters to a contact boiler; a contact boiler to bring a second portion of said superheated steam into contact with said condensate whereby said condensate evaporates while desuperheating said second portion of superheated steam producing a large quantity of substantially saturated steam and turbine driven steam circulating means for pumping said saturated steam to said reactor; the improvement wherein said reactor comprises a core comprising a plurality of fuel assemblies containing fissile fuel, and a plurality of control assemblies containing neutron absorbing material interspersed among said fuel assemblies; an inlet plenum located immediately above said core to receive steam from said steam circulator; means permitting steam to pass downwardly through said control assemblies from said inlet plenum to an intermediate steam plenum immediately below said core; means permitting steam to pass upwardly from said intermediate plenum to an outlet plenum located above said inlet plenum, through said fuel assemblies whereby said steam is superheated.

10. The reactor of claim 9 wherein said means permitting steam to pass upwardly from said intermediate plenum to said outlet plenum includes a plurality of tubular members passing through said inlet plenum and connecting each fuel assembly with said outlet plenum in fluid flow relationship.

11. The reactor of claim 9 wherein said outlet plenum is divided into a plurality of sgements, each segment receiving superheated steam from a portion of said fuel assemblies and each segment including an individual means permitting said superheated steam to leave said reactor.

12. The reactor of claim 9 wherein said core comprises a substantially right cylindrical array of closely packed hexagonal assemblies, with fuel assemblies and control assemblies adjacent the core axis surrounded by a ring-shaped array of reflector and reflector-control assemblies; the outermost ring of reflector assemblies including clamping means adapted to tightly clamp said assemblies together.

13. The reactor according to claim 9 further including an independent saturated steam inlet line and an independent superheated steam outlet line connected in fluid flow relationship to a single fuel assembly whereby said lines and fuel assembly constitute an isolated test loop.

14. The reactor of claim 9 wherein said control assemblies include neutron poison material containing portions, adapted to be moved between a position within the active fuel region to a position above said active fuel region, and drive means located below said reactor to move said portions between said positions; whereby hydraulic forces resulting from steam passing through said control assemblies between said inlet plenum and said intermediate plenum tend to move said portions into said active fuel region.

15. The reactor of claim 9 wherein said core, said inlet plenum, said intermediate plenum and said outlet plenum are contained within a pressure tight shroud surrounded by a shield water space within a reactor pressure vessel.

16. The reactor according to claim 15 further including a flooding water plenum located adjacent said intermediate plenum within said shroud, valve means adapted to admit water from said shield water space to said flooding water plenum, and a plurality of nozzles positioned to direct flooding water from said flooding water plenum directly into each fuel assembly.

* * * * *